Nov. 16, 1965 T. R. THOMAS 3,217,750
LUBRICATION
Filed June 21, 1960

INVENTOR.
THOMAS R. THOMAS
BY
ATTORNEY 3,217,750
LUBRICATION
Thomas R. Thomas, New York, N.Y., assignor to Auto Research Corporation, Dover, Del., a corporation of Delaware
Filed June 21, 1960, Ser. No. 37,793
13 Claims. (Cl. 138—41)

The present invention relates to a lubricant metering unit, and particularly to a lubricant flow metering unit to be used for the outlet of a centralized branched lubricating installation.

The present invention will be particularly described in its application to centralized lubricating installations in which there is a central pressure source or pump having branched distributing conduits or tubing system leading to various bearings in and about a machine tool, printing press, automobile chassis or other mechanism to be lubricated.

The tubing system is mounted in or about the machine to be lubricated with the outlets positioned at or adjacent to the bearings, and with each of the outlets consisting of an elongated flow metering fitting, having an inlet strainer, an outlet spring seated check valve and an intermediate high restriction flow metering passageway.

These high restriction metering fittings and particularly the highly restricted central flow passage thereof are positioned directly upon the bearings or connected thereto by tail pipes, and they offer such a high restriction and give such a high obstruction effect to the flow lubricant that in themselves they predominately control the distribution of lubricant among the various bearings in relatively minute yet accurately proportioned amounts in the order of several drops per hour without being effected by the friction due to varying lengths of piping or tubing and without being effected by the varying obstructing effects encountered in the bearings to be lubricated.

It is among the objects of the present invention to provide a novel flow metering fitting which will be effective to accurately proportion the distribution of lubricant over long periods of time without adjustment, replacement or servicing, and which when once installed, will operate effectively for the entire life of the machine without deviation to provide the predetermined proportionment to the bearing to be itself attached without variation or clogging.

In high restriction flow metering fittings of the type described, it is particularly important to be certain that any small particles of dust, dirt or soil that pass into the tubing distributing system should not clog or effect the preportionment of lubricant, and it is among the further objects of the present invention to provide a novel high restriction flow metering system of the character described which will eqectively prevent collection of fine particles in the narrow crevice forming the obstruction of the flow metering fitting and which will protect said crevice from deposition of finely divided foreign particles.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In the present invention, the flow metering fitting desirably consists of elongated metal unit, which may be bored from hexagonal rod which will have threaded inlet and outlet ends with an inlet strainer socket and an outlet spring seated check valve also received in the relatively wide socket.

Intermediate of these two sockets, there will be provided an elongated small flow passageway substantially completely filled by a natural obstruction unit which may be a threaded elongated member, but which is preferably a rod.

Desirably, the rod so completely fills the central flow passageway as to only leave a crevice of one or several thousandths of an inch which will offer the high obstructing effect.

Although the rod or pin may be moved by means of the spring press valve in one direction upon pressure application and in reverse direction upon release of pressure, it is highly sensitive to accumulation of dust or dirt particles and does not readily clean itself if there are substantial quantities thereof.

It has now been found that the most satisfactory protection to provide for in the inlet strainer socket, which will collect the soil and dirt and prevent passage therethrough into the narrowly restricted crevice between the pin and the bore, is a loose fiber strainer which is backed up by a perforated plate so that the horizontally extending strands in the strainer cannot pass the plate and tend to clog the narrow metering crevice.

In the preferred form of the invention, the backing disk for the strainer consists of a perforated metal laminate plate filter which is a thin plate having a larger number of perforations circular or square in shapes which are relatively small at one side and relatively wide at the other side and which plate is made of a material known as Lektromesh which is a composition resulting from successive plating of layers of nickel and copper which layers in effect may be regarded as a laminate and which layers due to their thinness are substantially integrated together and may be regarded as an alloy formed of a closely integrated multiple plated layered combination of nickel and copper.

Desirably, the body of the fitting consists of copper or brass whereas the restriction pin consists of steel.

Therefore, when the lubricant contacts or passes through the copper and nickel alloy perforated plate before the lubricant flows into the restricted passage, there will be no tendency toward electrical unbalance which would give rise to the creation of a static charge and cause separation of the fibers from the strainer and passage between the pin and the bore. By electrical unbalance is meant static electrical charges built up by the frictional effect of the lubricant flowing past the metal elements of the unit.

The preferred type of circular plate consists of a perforated metal plate with .004" square holes at the smallest width or diameter which are uniformly distributed in transverse rows across the entire disk which extends across the entire diameter.

In the preferred form of the invention the metal consisting of copper and nickel is .004" in thickness and the openings, as well as the spacing between the openings, will be of the order of .005" and desiraby the small openings may be kept on the side of the strainer with the large openings away from the strainer.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
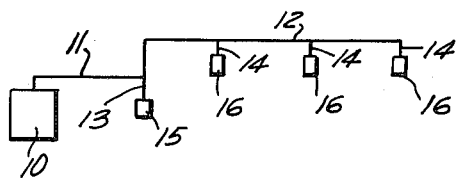
FIGURE 1 is a diagrammatic layout showing the central unit with a plurality of branched outlet tubing connections leading to flow metering outlets associated with various bearings to be lubricated.

Referring particularly to FIG. 1 there is shown a central pump unit 10 having the branched distributing conduit system 11 and 12 with the outlets 13 and 14 leading to the flow metering fittings 15 and 16 mounted on the bearings.

These fittings 15 and 16 may be screwed directly in openings in the bearings or they may be connected to the base by means of tail pieces and they will feed the bearings with small amounts of lubricant which are accurately determined and proportioned in accordance with the needs of the bearings.

Figure 2:
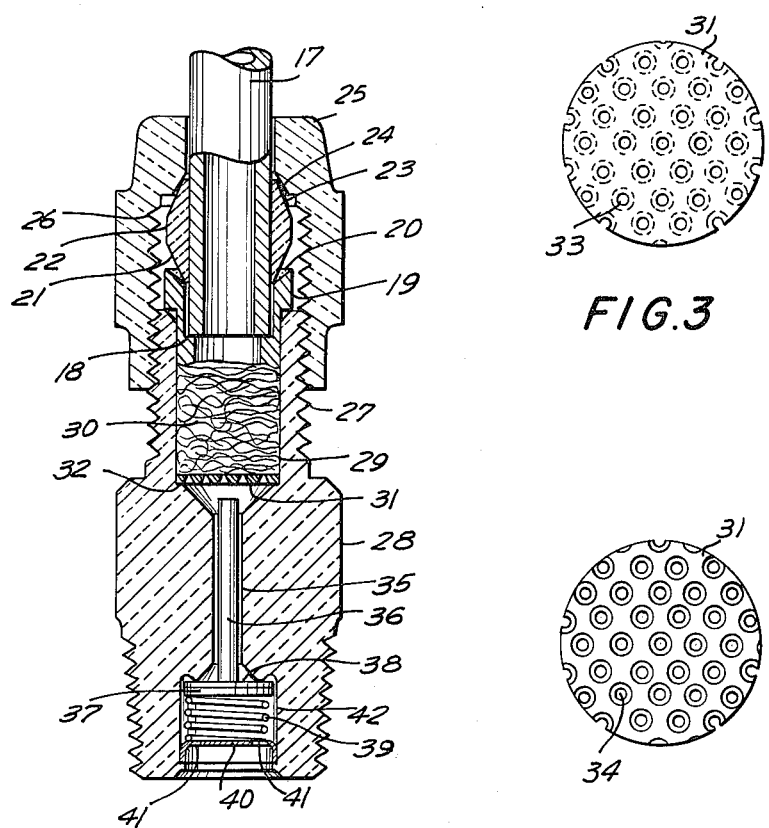
FIG. 2 is a longitudinal sectional view showing the flow metering outlet fitting with the backing plate of the present invention in position therein.

A typical flow metering fitting is shown in longitudinal section in FIG. 2 and it is provided with an inlet flow conduit 17 which abuts the shoulder 18 in the thimble 19.

The thimble 19 has a conical face 20 which reacts against the tapered end 21 of the double compression tapered coupling sleeve 22. The other taper 23 is acted upon by the tapered face 24 on the compression coupling nut 25.

The nut 25 is provided with an internal thread 26 which is screwed onto the threaded end 27 of the fitting 28.

The inlet socket 29 receives the mesh fibers 30 which act as a strainer and which are pressed in position by the inner end of the thimble 19.

The present invention is particularly directed to the backing plate 31 which fits on the shoulder 32.

Figure 3:
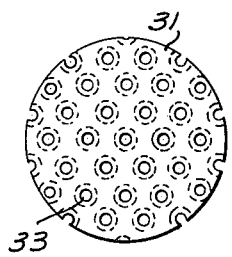
FIG. 3 is a top plan view of a typical plate with circular openings.
Figure 4:
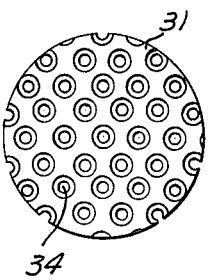
FIG. 4 is a plan view from the other side of said plate.
Figure 5:
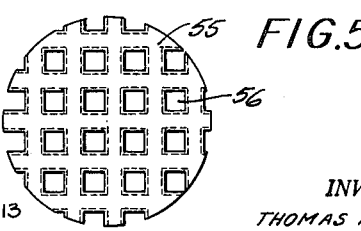
FIG. 5 is a top plan view showing an alternative form of plate with square openings instead of round openings as indicated in FIG. 4.

The backing plate 31 may have round openings as indicated in FIGS. 3 and 4 or square openings as indicated in FIG. 5.

As shown in FIGS. 3 and 4 there are a plurality of closely spaced round openings 33 which are of small diameter in the face indicated in FIG. 3 and having large diameter indicated at 34 in the bottom face as indicated in FIG. 4.

These openings extend uniformly over the entire area of the plate and they are divergent downwardly so that the openings increase in size as indicated in 31 at FIG. 2.

Referring to the body of the fitting, as shown in FIG. 2, there is a through passageway 35 receiving the pin 36 which substantially completely fills the passageway 35 and forms a narrow crevice of one or several thousandths of an inch. This pin will reciprocate under the effect of the valve 37 which has a silicone facing 38.

The valve 37 is backed by the coil spring 39 which fits against a cup-shaped retainer 40. This retainer has the openings 41 therein to permit passage of lubricant out of the valve chamber 42.

The loose fiber strainer 30 will hold up any dirt or soiled particles so that they do not clog the crevice 35, 36 but at the same time it will not change the rate of flow of the fitting.

The disk of FIGS. 3 and 4 will effectively keep any of the fine strainer strands from passing into the crevice between the pin 36 and opening 35.

In the alternative form in FIG. 5, there is also shown a disk 55 having square openings 56 which are wider at one end than at the other and which also serve to permit ready flow of lubricant while holding up any fine strands constituting the strainer 30.

These square openings are spaced apart the same distance as their opening area. Desirably, the square openings which give a greater flow area over the surface of the disk as indicated in FIG. 5 are preferred.

It has been found that these square or circular openings in the backings, as indicated in FIGS. 3, 4 and 5, will permit long usage of a fitting without changing the flow rate and without clogging due to the collection of soil or particles.

The formation of the perforated plates is desirably achieved by alternate plating upon a non-conductive plate or matrix which is a plastic composition having a series of projections which form the openings or holes.

A plastic composition is a non-conducting composition and it must be coated with an electrically conducting material such as carbon to enable electroplating.

These projections are of conical or pyramidal shape so that they each will form an opening which is wider at one side than at the other.

These projections together with the side of the plate which carries the projections are coated over the entire area of the face of the plate and projections with an electrical conducting material, such as carbon to form a base for the laminate and carry electrical current, and then alternately copper and nickel is plated thereon to give a copper-nickel laminate or combination with a total thickness of about .002 to .005" and a preferred thickness of about .004". The carbon forms a base upon which the alternate layers of copper and nickel are plated and carbon is retained in the first layer of metal deposited thereon on the side which has the largest openings.

By the term alloy is meant a deposition of alternate layers of copper and nickel which are very thin and together constitute a total thickness of about .004 inch. By the term unbalance is meant the creation of an electrostatic charge which results in separation of the fibers of the strainer which are then readily drawn through the screening and in this respect the present application constitutes an improvement over the subject matter of Bijur Patent No. 1,948,503.

Figure 6:
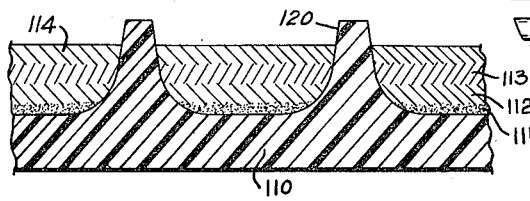
FIG. 6 is a diagrammatic fragmentary vertical cross-sectional view of a portion of a backing plate as it is formed upon a matrix upon enlarged scale.

In FIG. 6 is shown in enlarged scale the matrix 110 of plastic material which is non-conducting and which is provided with a thin plating of carbon 111 then a plating of copper 112, a plating of nickel 113 and another plating of copper 114. These platings may be reversed with the nickel being the first plating applied. The platings are very thin so as to substantially amalgamate with one another but they do form a multiple layered plating as indicated in FIG. 6 with the carbon 111 being substantially embedded into the lowermost carbon layer 112 or nickel layer if the nickel is lowermost. This multiple layered plating as shown in FIG. 6 may be stripped from the plastic matrix and used as the plate as shown in FIGS. 3, 4 and 5.

The prongs 120 may be conical to give the effect of FIGS. 3 and 4 or pyramidal to give the effect of FIG. 5 and their convergence may be varied to give the necessary slope to the sides of the openings 33 and 34 in FIGS. 3 and 4 and 56 in FIG. 5. The bottom face will be as shown in FIG. 4.

While there has been herein described a preferred form of the invention, it should be understood that the same may be altered in details and in relative arrangement of parts within the scope of the appended claims.

The plate or disk or screen or mesh 31 of FIGS. 2, 3 and 4 and 55 of FIG. 5 is of a material known as Lektromesh 100 which serves as a mesh or screen or filter or backing plate for the plug 30 which plate or disk or mesh or screen is perforated when formed on a base or matrix of non-conducting plastic material and which is formed by alternately plating thin layers of copper and nickel one after another forming a laminate which is substantially an alloy of copper and nickel since the two layers are integrally joined together and substantially amalgamated with each other. The plate or disk or mesh or screen therefore may be referred to either as an alloy or laminate.

FIG. 6 diagrammatically shows the copper and nickel platings as constituting separate layers for aid in understanding the invention and also shows a carbon base as a separate layer but it is to be understood that the thinness of the layers is such that the copper and nickel layers will penetrate within one another and constitute substantially an integral alloy and the carbon will penetrate substantially into the lowermost metal layer and actually be substantially embedded thereinto.

Having now particularly described and ascertained the nature of the invention, and what manner the same is to be performed, I claim:

1. For use in a centralized lubricating installation for liquid oil lubricant having a plurality of branched and distributing conduits leading to bearings on a machine at various levels and various distances from a central pump with one of high restriction flow metering outlet fittings at each bearing to give accurately proportioned minute quantities of lubricant throughout operation of the machine and without variations due to climatic conditions and due to differences of obstruction effect of the bearings and frictional effects resulting from varying lengths of lines or conduits, a metering fitting, an inlet socket and an outlet socket including a spring seated plastic faced check valve in the outlet socket and a substantially completely filled high restriction passage between said sockets and said passageway being readily subject to change in restricting effect when fibers lodge therein and a fibrous strainer plug in said inlet socket, said inlet socket having a bottom shoulder and a plate positioned on said shoulder below said strainer plug and above said restriction passage and consisting of a perforated multiple alternate electrically deposited copper-nickel integrally joined laminate of about .004″ in thickness and having a plurality of spaced perforations therein divergent toward the restriction passage and being in electrical contact with the body of the fitting which is of copper and in electrical communication with the pin which is of steel so as to eliminate any tendency toward electrical static unbalance which would tend to separation of the fibers and passage of the fibers through the perforated plate.

2. The installation of claim 1, said perforated plate having a plurality of rows of conical openings spaced from each other about the same distance as the thickness of the plate and said rows extending transversely to one another over the entire area of the disk.

3. The installation of claim 1, said restriction passageway being of the order of not more than several thousandths of an inch and said openings having an area of the order of .004″ to .005″ thousandths of an inch.

4. The installation of claim 1, said perforated plate having pyramidal openings therein.

5. The installation of claim 1, said perforated plate having a base of carbon in contact with the shoulder at the bottom of the inlet socket.

6. For use in a centralized lubricating installation for liquid oil lubricant having a plurality of branched and distributing conduits leading to bearings on a machine at various levels and various distances from a central pump with one of high restriction flow metering outlet fittings at each bearing to give accurately proportioned minute quantities of lubricant throughout operation of the machine and without variations due to climatic conditions and due to differences of obstruction effect of the bearings and frictional effects resulting from varying lengths of lines or conduits, a metering fitting having an elongated copper body, an inlet socket and an outlet socket including a spring seated plastic faced check valve in the outlet socket and a substantially completely filled high restriction passage between said sockets, a steel pin in said passage, and said passage being readily subject to change in restricting effect when fibers lodge therein and a fibrous strainer plug in said inlet socket, said inlet socket having a bottom shoulder and a backing plate for said plug, said plate being positioned on said shoulder below said strainer plug and above said restriction passage and consisting of a perforated alternately electrically deposited copper and nickel perforated laminate of about .002 to .005 inch in thickness and having a plurality of spaced perforations therein divergent toward the restriction passage and said plate being in contact with the body of the fitting.

7. The installation of claim 6, said perforated disk having a plurality of closely spaced transverse rows of openings spaced from each other about .005 inch and said openings being divergent and increasing in dimension away from the plug and said openings having a width of about .004 inch and the lowermost face of the disk away from the plug having carbon embedded therein.

8. For use in a high restriction flow metering installation for use in a centralized lubricating installation for liquid oil lubricant having a plurality of branched and distributing conduits leading to bearings on a machine at various levels and various distances from a central pump with one of said high restriction flow metering outlet fittings being positioned at each bearing to give accurately proportioned minute quantities of lubricant throughout operation of the machine and without variations due to climatic conditions and due to differences of obstruction effect of the bearings and frictional effects resulting from varying lengths of lines or conduits, a fitting having an elongated copper body including an inlet socket and an outlet socket, a spring seated plastic faced check valve in the outlet socket and a substantially completely filled high restriction passage between said sockets, a steel pin in said passage, and said passage being readily subject to change in restricting effect when fibers lodge therein and a fibrous strainer plug in said inlet socket, said inlet socket having a bottom shoulder and a backing plate for said plug, said plate being positioned on said shoulder below said strainer plug and above said restriction passage and consisting of a metal mesh screen of copper and nickel having a plurality of openings extending therethrough which are small on the face toward the strainer plug and large on the face away from the strainer plug.

9. The fitting of claim 8, said screen consisting of alternately electrically deposited copper and nickel layers providing a plate, said plate being of about .002 to .005 inch in thickness and having the perforations therein spaced and divergent toward the restriction passage and said plate being in contact with the body of the fitting.

10. The fitting of claim 8, said screen consisting of a perforated disk having a plurality of closely spaced transverse rows of openings spaced from each other about .005 inch and said openings being divergent and increasing in dimension away from the plug and said openings having a width of about .004 inch and the lowermost face of the disk away from the plug having carbon embedded therein.

11. The fitting of claim 8, said screen consisting of a perforated disk having a plurality of rows of conical openings spaced from each other about the same distance as the thickness of the disk and said rows extending transversely to one another over the entire area of the disk.

12. The fitting of claim 8, said screen being positioned before a restriction passage having a spacing of the order of not more than several thousandths of an inch and said openings in the screen having an area of the order of .004 to .005 thousandths of an inch.

13. The fitting of claim, said screen consisting of an alternating electrically deposited nickel-copper laminate-carbon base taking the form of perforated multiple alternate layer integrally joined metal laminate disk plate constituting essentially of a copper-nickel-alloy.

(References on following page)

References Cited in the file of this patent

UNITED STATES PATENTS

| | | | |
|---|---|---|---|
| 27,649 | 3/1860 | Orne | 138—41 X |
| 1,078,625 | 11/1913 | Keller | 138—41 X |
| 1,948,503 | 2/1934 | Bijur | 138—41 |
| 1,975,631 | 10/1934 | Bonfield | 138—41 X |
| 2,138,256 | 11/1938 | Schuyler | 210—243 |
| 2,576,610 | 11/1951 | Kunzog | 138—41 |

LEWIS J. LENNY, *Primary Examiner.*

EDWARD V. BENHAM, *Examiner.*